(12) United States Patent
Rodi

(10) Patent No.: US 9,303,666 B2
(45) Date of Patent: Apr. 5, 2016

(54) TOOL HOLDER, TOOL, AND WORK STATION WITH TOOL HOLDER AND TOOL ATTACHED THERETO

(71) Applicant: Uhlmann Pac-Systeme GmbH & Co. KG, Laupheim (DE)

(72) Inventor: Wolfgang Rodi, Laupheim/Baustetten (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 321 days.

(21) Appl. No.: 13/894,975

(22) Filed: May 15, 2013

(65) Prior Publication Data

US 2013/0308996 A1  Nov. 21, 2013

(30) Foreign Application Priority Data

May 16, 2012  (EP) .................................... 12168221

(51) Int. Cl.
*F16B 5/06* (2006.01)
*B29C 51/26* (2006.01)
*B29C 33/30* (2006.01)
*B29C 51/30* (2006.01)

(52) U.S. Cl.
CPC .............. *F16B 5/0642* (2013.01); *B29C 51/264* (2013.01); *B29C 33/305* (2013.01); *B29C 51/30* (2013.01); *Y10T 403/20* (2015.01)

(58) Field of Classification Search
CPC ..... F16B 5/0645; B29C 51/264; B29C 51/30; B29C 51/26; B29C 51/428; B29C 33/305; B29C 33/306; B23Q 1/38; B23Q 1/621; B23Q 1/0018; B23Q 1/28

USPC .......... 269/10, 47, 48, 91, 95, 290, 291, 303, 269/315, 318, 87, 287
See application file for complete search history.

(56) References Cited

U.S. PATENT DOCUMENTS

| 4,502,656 | A | * | 3/1985 | Zeitler | ................... F16M 11/04 248/346.03 |
| 4,805,888 | A | * | 2/1989 | Bishop | ................ B23Q 1/5468 269/235 |
| 5,005,813 | A | * | 4/1991 | Lawrence | ...................... 269/236 |
| 5,056,766 | A | * | 10/1991 | Engibarov | ............... B25B 5/08 269/101 |
| 5,167,405 | A | * | 12/1992 | Cayley, Jr. | .................... 269/309 |

(Continued)

FOREIGN PATENT DOCUMENTS

DE           19504513 A1    8/1996
DE       102006004093 B3    3/2007

(Continued)

OTHER PUBLICATIONS

European Search Report for priority application EP 12168221 dated Dec. 6, 2012.

*Primary Examiner* — Monica Carter
*Assistant Examiner* — Seahee Yoon
(74) *Attorney, Agent, or Firm* — Brinks Gilson & Lione

(57) ABSTRACT

The clamping system for attaching a tool to a tool holder offers highly precise self-adjustment of the tool in the tool holder, which remains in effect even at the high tool temperatures encountered during operation. For this purpose, the tool comprises a central clamping bolt, a positioning pin, and a groove, whereas the tool holder comprises a draw bolt, a T-slot, and a register pin. The draw bolt draws the clamping bolt by way of slanted surfaces against the tool holder with force components acting in three directions.

13 Claims, 9 Drawing Sheets

(56) References Cited

U.S. PATENT DOCUMENTS

| | | |
|---|---|---|
| 7,402,035 B2 | 7/2008 | Matzenmuller et al. |
| 7,584,687 B2 | 9/2009 | Matzenmuller et al. |
| 8,011,648 B1 * | 9/2011 | Nelson .................. B23Q 3/103 269/138 |
| 8,991,024 B2 * | 3/2015 | Barillaro ................. B25B 5/101 269/140 |
| 2011/0056628 A1 | 3/2011 | Ruf et al. |

FOREIGN PATENT DOCUMENTS

| | | |
|---|---|---|
| EP | 0467069 A1 | 1/1992 |
| EP | 1657047 A2 | 5/2006 |
| EP | 2292409 A1 | 3/2011 |

* cited by examiner

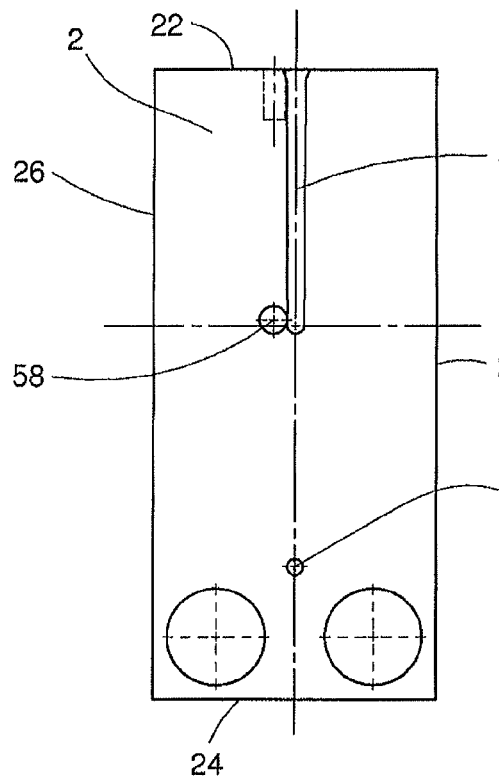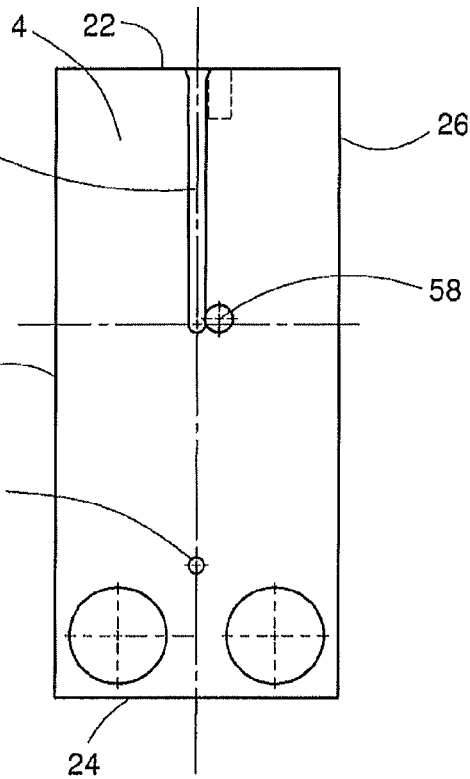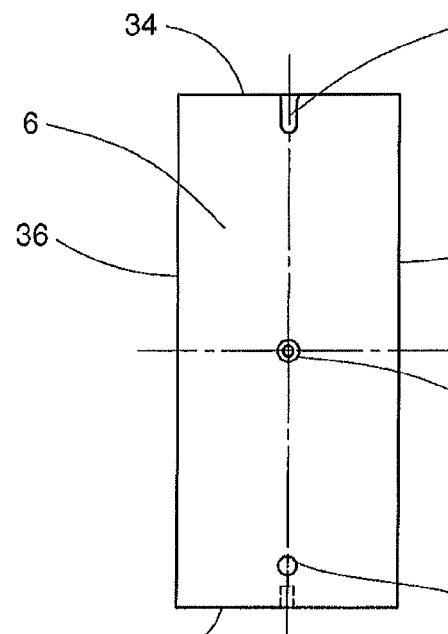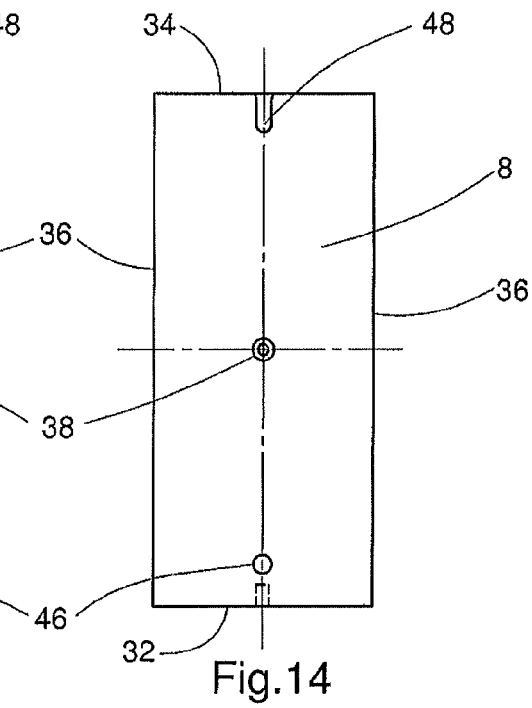

TOOL HOLDER, TOOL, AND WORK STATION WITH TOOL HOLDER AND TOOL ATTACHED THERETO

RELATED APPLICATIONS

The present patent document claims the benefit of priority to European Patent Application No. EP 12168221.5, filed May 16, 2012, the entire contents of each of which are incorporated herein by reference.

FIELD AND BACKGROUND OF THE INVENTION

The present invention relates to a tool holder, a tool, and a work station with a tool holder and the tool attached thereto.

In many areas of industry, it is essential that tools be attached to their tool holders in a precise and secure manner. Work stations consisting of a tool holder and a tool attached thereto must often be positioned to within fractions of a millimeter so that the operations in question can be carried out with sufficient accuracy.

In the area of the pharmaceutical industry, a large number of work stations following one after the other is required for the production of blister packs, for example. Because the tools must often be designed to accommodate different blister pack formats, it is necessary to replace the tools in accordance with the specifications in question.

For this purpose, there are many different ways in which tools can be attached to tool holders in a manner which makes it possible to replace the tools and to minimize the effort required for adjustments.

An example of an attachment mechanism of this type is described in U.S. Pat. No. 7,584,687. Here a cone is formed in the surface of the tool. A clamping bolt is acting on this cone, which clamping bolt comprises a pressure surface corresponding to the shape of the cone. This guarantees a secure connection between the tool holder and the tool, but it is still possible to replace the tools relatively easily. Certain problems involving tolerances, however, have not been completely solved.

SUMMARY OF THE INVENTION

It is an object of the present invention to provide a tool holder and a tool attached thereto which make it possible for tools of a large number of different sizes to be easily replaced and at the same time to provide for the highly precise self-adjustment of the tool in the tool holder, this adjustment remaining intact even at the high tool temperatures encountered during operation.

According to an aspect of the invention, the tool holder comprises:

a base body, which comprises a top, a bottom, two short sides, and two long sides, a register pin projecting from the top or bottom of the base body, this register pin being arranged in the middle between the long sides and closer to the short rear side than to the short front side;

a straight T-slot in the base body, which T-slot is arranged in the middle between the long sides and extends from the short front side along the top or bottom of the base body to a terminal area of the T-slot arranged in an area of the base body between the short front side and the short rear side, preferably in a middle area of the base body;

a spindle pin with a conical tip, which is directly adjacent and parallel to the T-slot and is free to move in the base body;

a draw bolt, which is arranged in a recess in the base body near the terminal area of the T-slot, and which is slightly offset from the terminal area of the T-slot in the direction toward one of the two long sides of the base body and in the direction toward the short front side of the base body;

wherein the draw bolt comprises an opening with a slanted guide surface for the conical tip of the spindle pin, this opening being arranged in such a way that the draw bolt is pulled into the tool holder when the conical tip of the spindle pin moves toward a clamping position; and wherein the draw bolt also comprises a slanted working surface, which serves to engage with a corresponding slanted target surface on a clamping bolt on the tool.

According to another aspect of the invention, the corresponding tool comprises:

a base body, which comprises a top, a bottom, two short sides, and two long sides, a clamping bolt projecting from the top or bottom of the base body, the clamping bolt being arranged substantially in the middle between the long sides and substantially in the middle between the short sides, wherein the clamping bolt has the shape of a mushroom with a cylindrical lower part and a head part, which comprises a slanted target surface, upon which the slanted working surface of the draw bolt in the tool holder acts;

a cylindrical positioning pin, which projects from the tool in the same direction as the clamping bolt, wherein the positioning pin is arranged in the middle between the long sides and closer to the short front side than to the short rear side, and wherein the positioning pin has a diameter at least as large as the diameter of the lower part of the clamping bolt; and a groove, which is arranged in the middle between the long sides and extends from the short rear side into the base body.

With this design it is possible to define the position of the tool on the tool holder with high precision.

Additional advantages of this design are the reduced amount of set-up work, low manufacturing costs, and the low height of the tools, because there is no need to mill deep grooves into the tool. Finally, in the case of pairs of the tools, one of which is heated, the tool clamping according to the invention also increases processing reliability, because the heated tool is fixed in the center, which means that the expansion of the heated tool relative to the cold tool is minimized.

In a preferred embodiment of the tool holder, the slanted working surface of the draw bolt has the form of part of the lateral surface of a cone. In this way it is possible to produce a positive connection with the corresponding target surface of the clamping bolt on the tool.

The slanted target surface of the clamping bolt in the tool preferably also has the form of part of the lateral surface of a cone.

An especially good clamping action is achieved when the slanted working surface of the draw bolt of the tool holder is at an angle of 10-45°, and preferably of 10-30°, to the horizontal.

Correspondingly it is advantageous when the slanted target surface of the clamping bolt of the tool is at an angle of 10-45°, and preferably of 10-30°, to the horizontal.

To guarantee the reliable guidance of the conical tip in the draw bolt of the tool holder and simultaneously to control the force acting on the draw bolt, the opening in the draw bolt for the conical tip is preferably conical, and the diameter of the end of the opening facing the short front side is larger than the diameter of the wider end of the conical tip.

A spring element preferably spring-loads the draw bolt in the tool holder in the direction toward the open end of the recess, so that, when the conical tip of the spindle pin moves along the guide surface toward the clamping position, the conical tip pulls the draw bolt into the tool holder against the force of the spring element.

The register pin in the tool holder is preferably a cylindrical pin.

The diameter of the positioning pin on the tool is preferably larger than the diameter of the lower part of the clamping bolt. In this way, any overdetermination of the clamping function is avoided.

A work station equipped with at least one tool holder according to the invention and at least one tool according to the invention is preferably characterized in that the draw bolt of the tool holder is arranged with such an offset from the terminal area of the T-slot in the direction toward one of the two long sides of the base body of the tool holder and in the direction toward the short front side of the base body of the tool holder, and the clamping bolt of the tool is dimensioned in such a way that the force exerted by the draw bolt on the clamping bolt comprises a first force component acting toward the top or bottom of the tool holder, a second force component acting toward the long sides of the tool holder, and a third force component acting toward the short rear side of the tool holder. This guarantees that the tool will be fixed in position in the tool holder in three dimensions.

In its narrow area, the width of the T-slot in the tool holder corresponds to the diameter of the positioning pin in the tool. In this way, through the interaction of the positioning pin with the T-slot, it is possible to achieve a precise orientation of the tool in the area of the short front side.

Finally, it is advantageous for the groove in the tool to comprise a width which is equal to or slightly larger than the diameter of the register pin projecting from the tool holder. This makes it easier to insert the tool into the tool holder, and at the same time the tool is positioned relative to the tool holder in the area of the short rear side.

BRIEF DESCRIPTION OF THE DRAWINGS

Additional advantages and features of the tool holder, tool, and work station according to the invention can be derived from the following description, which makes reference to the drawings.

FIG. 11 is a view from below of the upper tool holder of FIG. 1;

FIG. 12 is a top view of the lower tool holder of FIG. 1;

FIG. 13 is a top view of the upper tool of FIG. 1; and

FIG. 14 is a view from below of the lower tool of FIG. 1.

DETAILED DESCRIPTION OF SPECIFIC EMBODIMENTS

Figure 1:
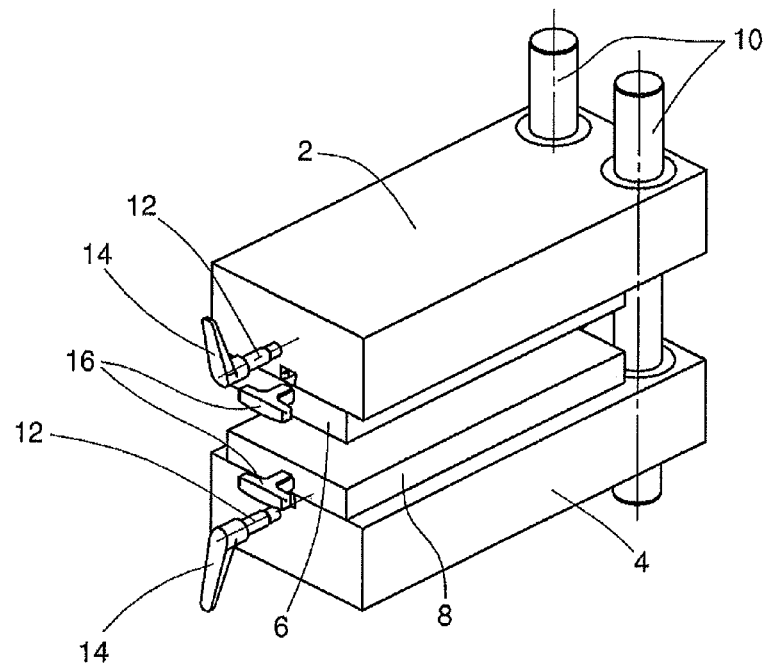
FIG. 1 is a schematic, perspective view of part of a work station with two tool holders and the associated tools in the installed state.
Figure 2:
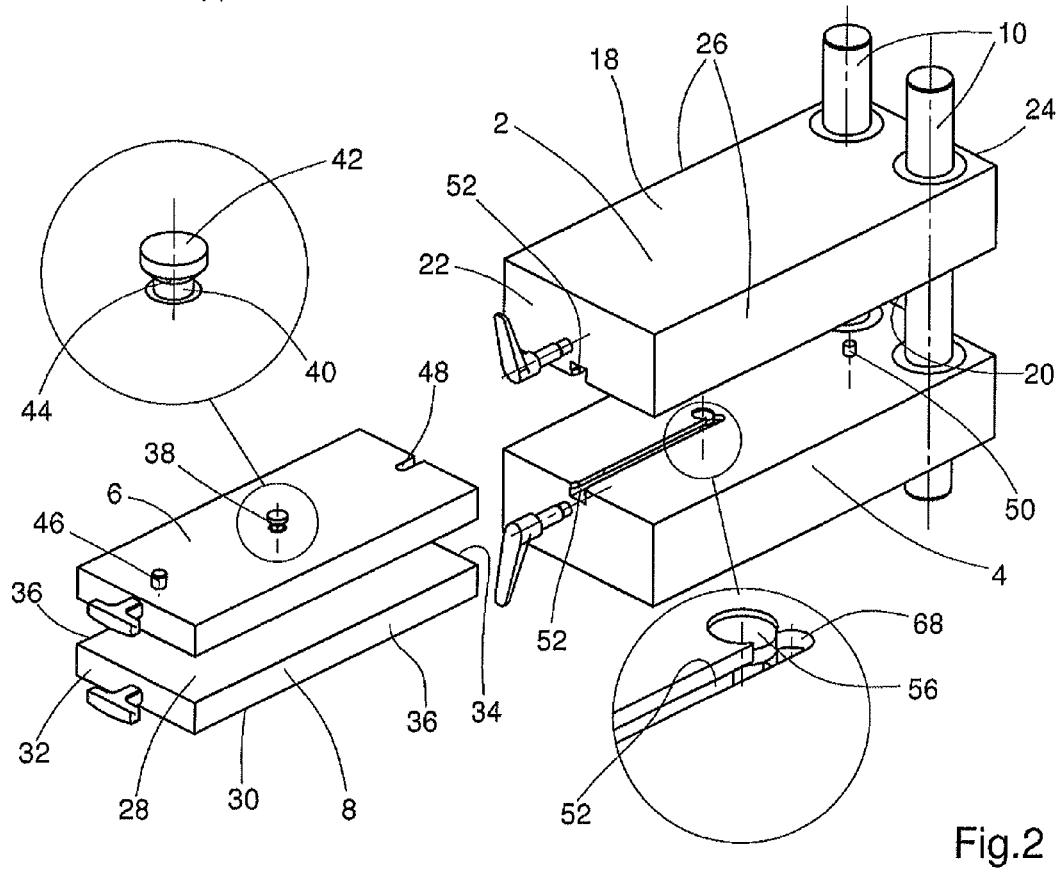
FIG. 2 is a schematic, perspective view according to FIG. 1 with the tools in the uninstalled state.

FIGS. 1 and 2 show part of a typical work station of a thermoforming machine with an upper tool holder 2, a lower tool holder 4, an upper tool 6 attached to the upper tool holder 2, and a lower tool 8 attached to the lower tool holder 4. In various applications, the upper tool holder 2 is also called the cross-arm, whereas in certain applications the lower tool holder 4 is also called the lifting table. The tools 6, 8 can be any possible types of tools which can be attached to tool holders 2, 4. In the area of the production of blister packs, such tools 6, 8 could be forming tools, embossing tools, perforating tools, stamping tools, sealing tools, and the guide plates for guiding the sheet webs inside the working line.

The tool holders 2, 4 and thus the tools 6, 8 are held in position with respect to each other during operation by guide columns 10. Regardless of the type of tool, it is necessary for a reliable process that each tool be aligned precisely. In applications with two tools 6, 8, the upper tool 6 must be aligned precisely with the lower tool 8. As an addition to the guidance of the tool holders 2, 4 on the common guide columns 10, the clamping attachment system for the tools 6, 8 to the tool holders 2, 4 according to the invention provides this reliable and precise alignment of each tool 6, 8.

Figure 3:
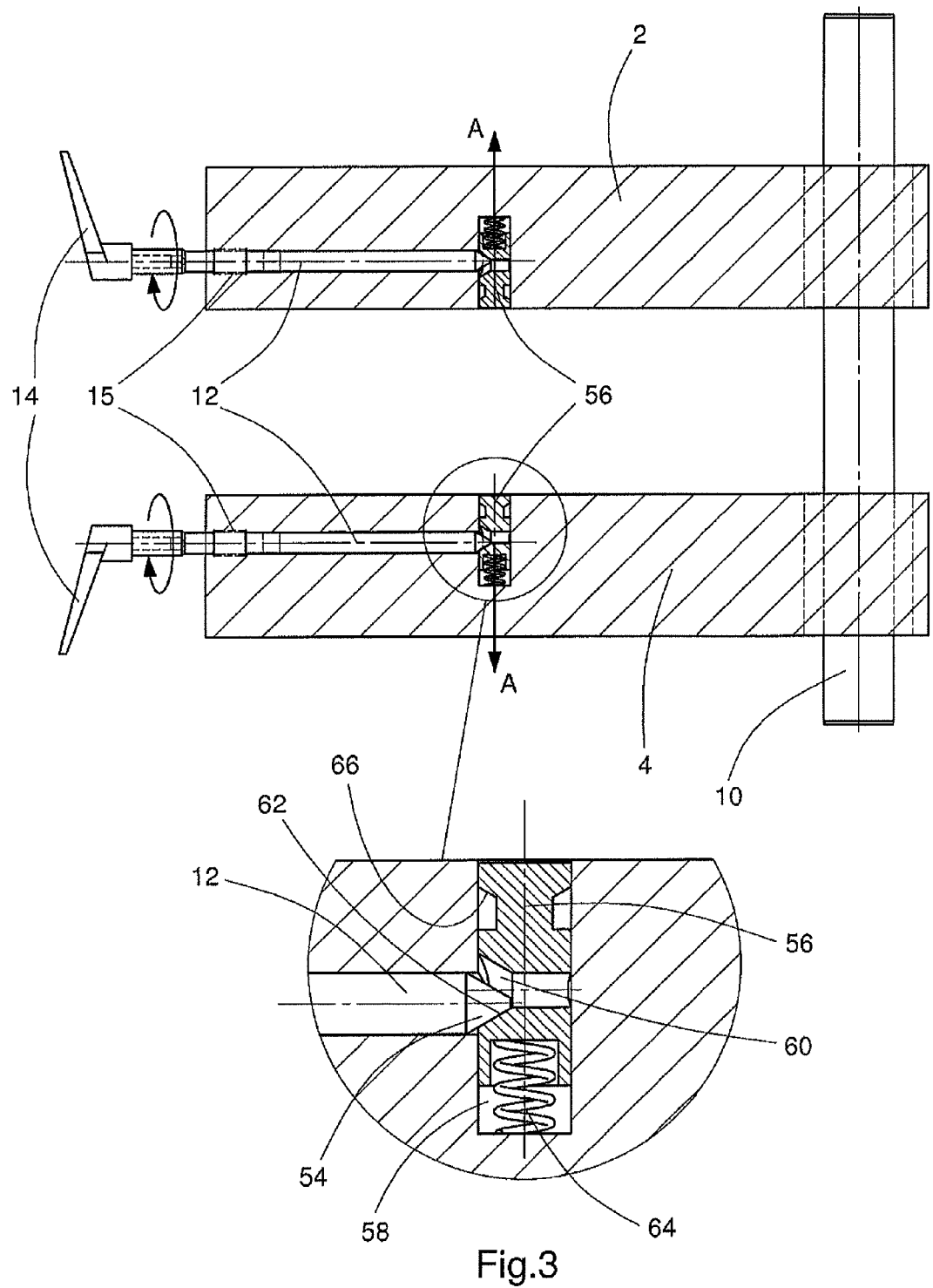
FIG. 3 is a schematic, longitudinal cross section through the tool holder of FIG. 1.

As can be seen in FIGS. 1 and 2, the tools 6, 8 are usually pushed into the tool holders 2, 4 from the front, and after reaching a stop, they are then clamped firmly in place by actuation of a spindle pin 12. In the example shown here, this is done by turning a lever handle 14 attached to the spindle pin 12. The spindle pin 12 is connected to the base body of the tool holder 2, 4 by a thread 15 (FIG. 3). Grips 16 can be arranged on the tools 6, 8 to make it easier to insert the tools 6, 8 into the tool holders 2, 4 and to pull them back out again. In the position shown in FIG. 1, the tools 6, 8 have been pushed into the tool holders 2, 4, whereas in the position shown in FIG. 2, they have been removed from the tool holders 2, 4.

Referring now to FIG. 2, each tool holder 2, 4 comprises a base body, which comprises a top 18, a bottom 20, a short front side 22, a short rear side 24, and two long sides 26. The side from which the tool 6, 8 in question is pushed into the tool holder 2, 4 is designated the short front side 22 of the tool holder 2, 4. In FIG. 2, reference numbers have been provided only for the various named side areas of the upper tool holder 2, but they also apply in the same way on the lower tool holder 4. A tool holder 2, 4 can also have a shape which deviates from the rectangular one shown.

Each tool 6, 8 also comprises a base body with a top 28, a bottom 30, a short front side 32, a short rear side 34, and two long sides 36. These surfaces are identified only on the lower tool 8 in FIG. 2, but they are also present identically on the upper tool 6. The side which, in the installed state, is arranged in the area of the short front side 22 of the tool holder 2, 4 is referred to as the short front side 32 of the tool 6, 8. The tools 6, 8 are thus pushed into the tool holders 2, 4 with their short rear sides 34 going in first. The tools 6, 8 can have a shape different from the rectangular one shown, especially on their working surfaces (top of the lower tool 8, bottom of the upper tool 6).

Figure 4:
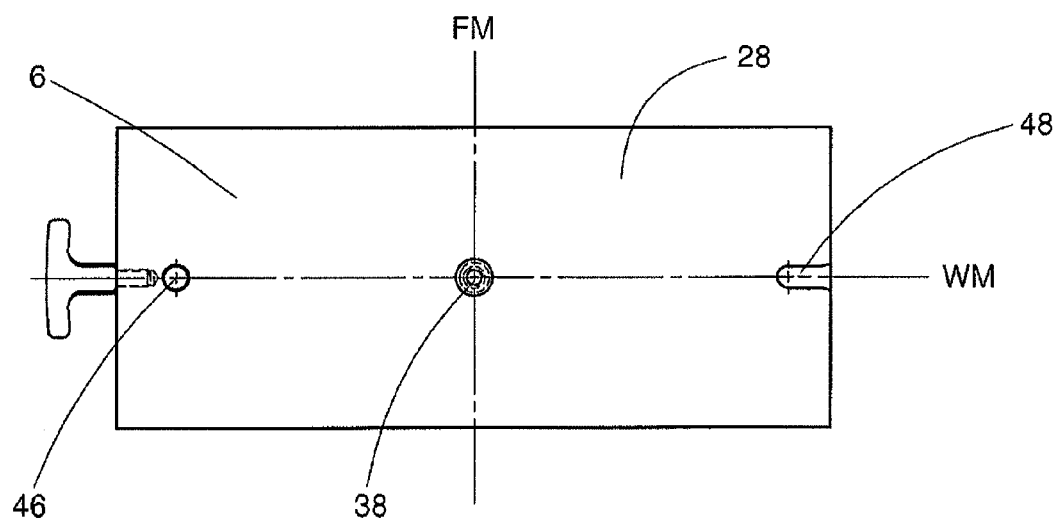
FIG. 4 is a top view of a tool according to FIG. 1.

Referring to FIGS. 2 and 4, first the tools 6, 8 with their associated clamping elements are now described in more detail based on the example of the upper tool 6. The tool 6 comprises a clamping bolt 38 projecting from the top 28 of its base body, this bolt being arranged substantially in the middle between the long sides 36 of the tool 6 and thus, with respect to the longitudinal orientation of the tool, exactly in the center WM of the tool (see FIGS. 4-7). In addition, the clamping bolt 38 is preferably arranged substantially in the middle between the short sides 32, 34 of the tool 6, so that, after the tool 6 has been installed, the clamping bolt 38 is preferably also exactly in the center FM of the sheet web to be processed by the tool 6 (see again FIGS. 4-7).

The clamping bolt 38 has the shape of a mushroom with a cylindrical lower part 40 and a head part 42. The head part 42 comprises a slanted target surface 44, upon which the slanted working surface of a draw bolt in the tool holder acts (see below for a more detailed description). The slanted target surface 44 of the clamping bolt 38 has preferably the form of part of the lateral surface of a cone, and it extends at an angle α of preferably 10-45°, more preferably of 10-30°, to the horizontal (see FIG. 8).

The tool 6 also comprises a cylindrical positioning pin 46, which also projects from the top 28 of the tool 6. The positioning pin 46 is arranged in the middle between the long sides 36 of the tool 6 and closer to the short front side 32 of the tool 6 than to its short rear side 34. The diameter of the positioning pin 46 is in all cases larger than that of the lower section 40 of the clamping bolt 38. More detailed information on the preferred dimensions is given further below with reference to FIGS. 13 and 14.

Finally, the tool 6 comprises a groove 48, which is arranged in the middle between the long sides 36 of the tool 6 and extends from the short rear side 34 into the base body of the tool 6.

The same elements 38, 46, and 48 are also provided, as mirror images, in the lower tool 8, but in this case the clamping bolt 38 and the positioning pin 46 project from the bottom 30 of the lower tool 8, whereas the top 28 of the lower tool 8 and the bottom 30 of the upper tool 6 serve purely as the working surfaces of the tools 6, 8.

Figure 5:
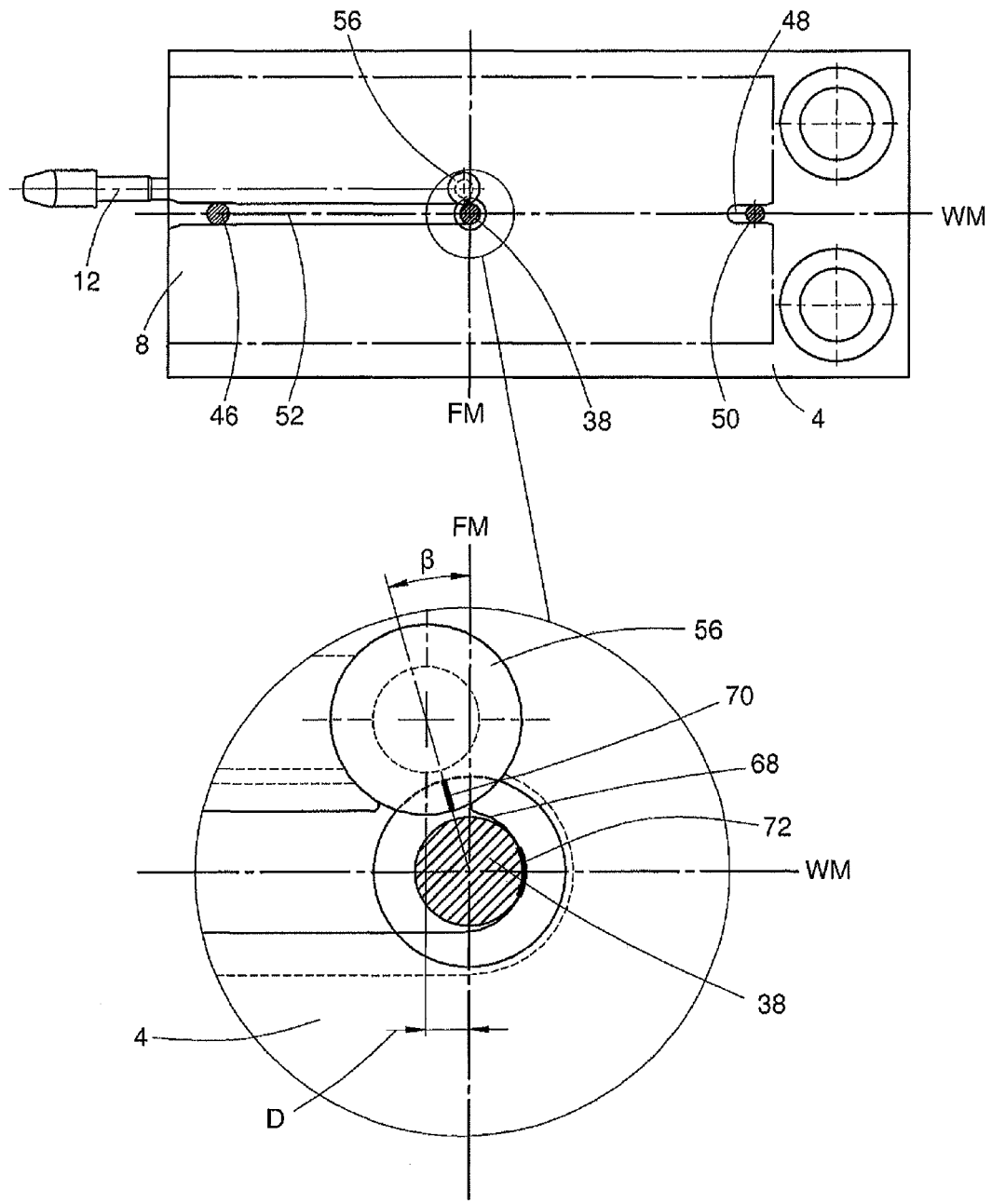
FIG. 5 is a schematic, top view of the tool holder according to FIG. 1 with the tool attached to it, wherein the tool is illustrated transparently for the sake of clarity.

A preferred embodiment of the tool holder 2, 4 according to the invention will now be described in greater detail with reference to FIG. 2 and to the upper part of FIG. 5 on the basis of the lower tool holder 4 as an example. The tool holder 4 comprises a register pin 50, projecting from the top 28 of the base body of the tool holder 4, this pin being arranged in the middle between the long sides 26 of the tool holder 4 and closer to the short rear side 24 of the tool holder 4 than to its short front side 22. The register pin 50 is preferably a cylindrical pin.

The base body of the tool holder also comprises a straight T-slot 52, which is arranged in the middle between the long sides 26 of the tool holder 4 and extends from the short front side 22 along the top 18 of the tool holder 4 to a terminal area of the T-slot 52 between the short front side 22 and the short rear side 24, which terminal area is preferably arranged in a middle area of the base body. The T-slot 52 is designed in such a way that the head part 42 of the clamping bolt 38 of the tool 8 fits into the wider section; thus the clamping bolt 38 can slide along the T-slot 52 all the way to the end stop of the T-slot 52 in a guided manner.

Immediately adjacent and parallel to the T-slot 52, the movable spindle pin 12, which comprises a conical tip 54 (see FIG. 3), extends through the base body of the tool holder 4.

The tool holder 4 also comprises a draw bolt 56, which is arranged in a recess 58 in the base body, near the terminal area of the T-slot 52, as can be seen most clearly in FIG. 3. The draw bolt 56 is slightly offset from the terminal area of the T-slot 52 toward one of the two long sides 26 of the tool holder 4 and toward the short front side 22 of the tool holder 4. The draw bolt 56 comprises an opening 60 with a slanted guide surface for the conical tip 54 of the spindle pin 12. The opening 60 is arranged in such a way and the guide surface 62 designed in such a way that the draw bolt 56 is drawn vertically farther down into the tool holder 4 when the conical tip 54 of the spindle pin 12 moves toward a clamping position, that is, toward the short rear side 24 of the tool holder 4.

The opening 60 in the draw bolt 56 for the conical tip 54 is preferably conical, and its diameter, at the end facing the short front side 22 of the tool holder 4, is larger than the diameter of the wider end of the conical tip 54 (see FIG. 3).

A spring element 64 spring-loads the draw bolt 56 toward the open end of the recess 58, so that, when the conical tip 54 of the spindle pin 12 moves along the guide surface 62 toward the clamping position, the conical tip 54 pulls the draw bolt 56 into the tool holder 4 against the spring force of the spring element 64. In the example shown here, the spring element 64 is designed as a compression spring.

The draw bolt 56 also comprises a slanted working surface 66, which serves to engage with the corresponding slanted target surface 44 of the head part 42 of the clamping bolt 38 in the tool 6, 8. The slanted working surface 66 of the draw bolt 56 is preferably at an angle α' of 10-45°, more preferably of 10-30°, to the horizontal (see FIG. 8). The slanted working surface 66 of the draw bolt 56 preferably also has the form of part of the lateral surface of a cone. The term "slanted" for the working surface 66 and for the target surface 44, however, is intended to cover not only curved slanted surfaces but also straight slanted surfaces.

The upper tool holder 2 comprises the same elements described so far for the lower tool holder 4. Nevertheless, the register pin 50 and the T-slot 52 are not arranged on the top but rather on the bottom 20 of the upper tool holder 2. Otherwise, the structure and function of the clamping device is identical to that of the lower tool holder 4.

Figure 6:
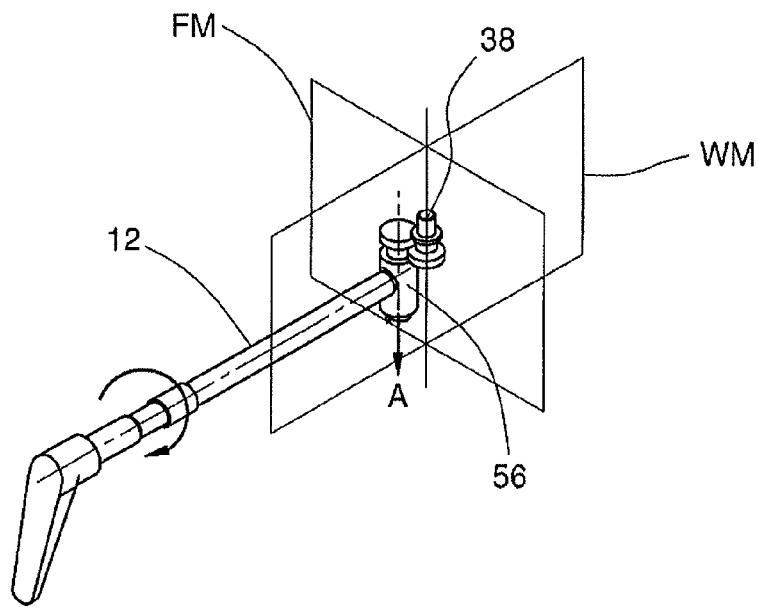
FIG. 6 is a schematic, perspective view of the movable elements of a tool clamping system according to the invention and of the directions in which the force components act.
Figure 7:
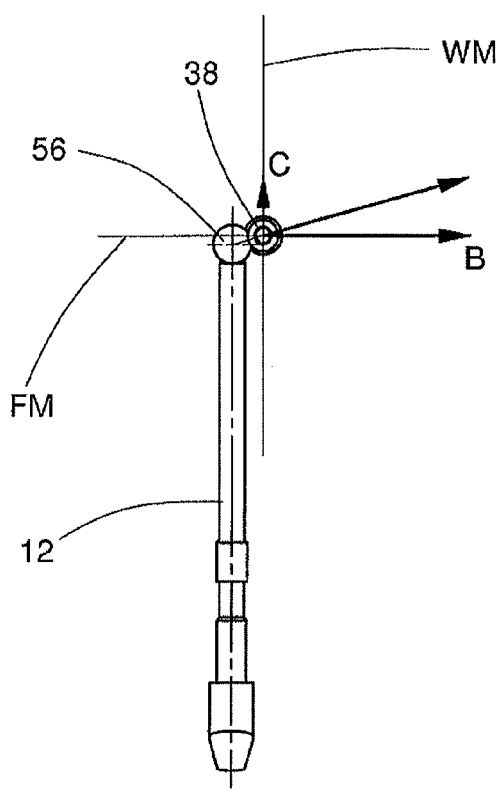
FIG. 7 is a top view of the elements shown in FIG. 6.

The tool holders 2, 4 and the tools 6, 8 are designed in such a way that the draw bolt 56 of the tool holder 2, 4 is always offset in such a way from the terminal area of the T-slot 52 toward one of the two long sides 26 of the tool holder 2, 4 and toward the short front side 22 of the tool holder 2, 4, and the clamping bolt 38 of the tool 6, 8 and the draw bolt 56 of the tool holder 2, 4 are designed in such a way that the force exerted by the draw bolt 56 on the clamping bolt 38 comprises a first force component A acting toward the top 18 or bottom 20 of the tool holder 2, 4, also a second force component B acting toward one of the two long sides 26 of the tool holder 2, 4, and a third force component C acting toward the short rear side 24 of the tool 2, 4. The corresponding orientations of these force components A, B, and C are illustrated in FIGS. 6 and 7.

Figure 8:
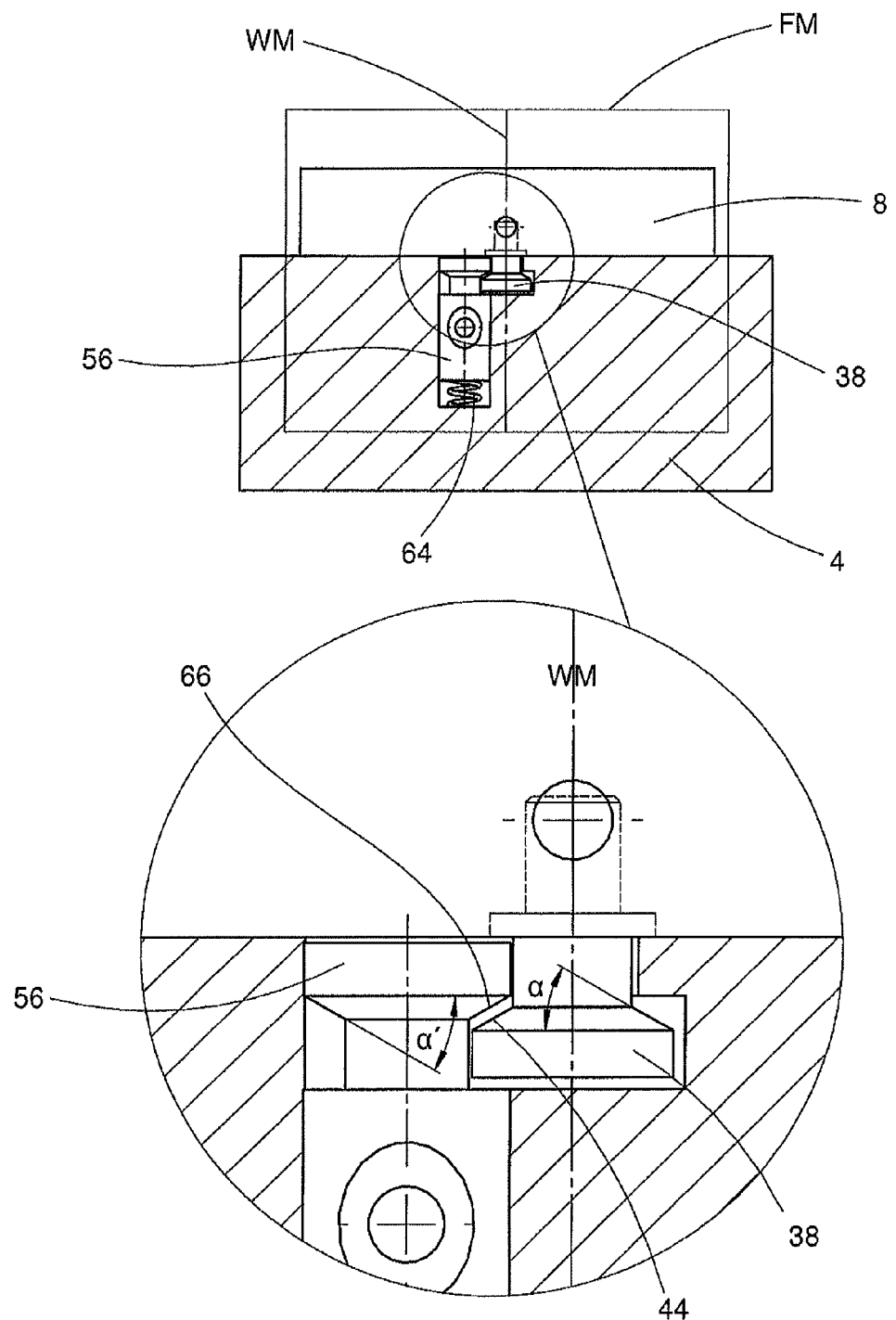
FIG. 8 is a schematic, cross-sectional view of the clamping elements of the tool clamping system in the untightened position.
Figure 9:
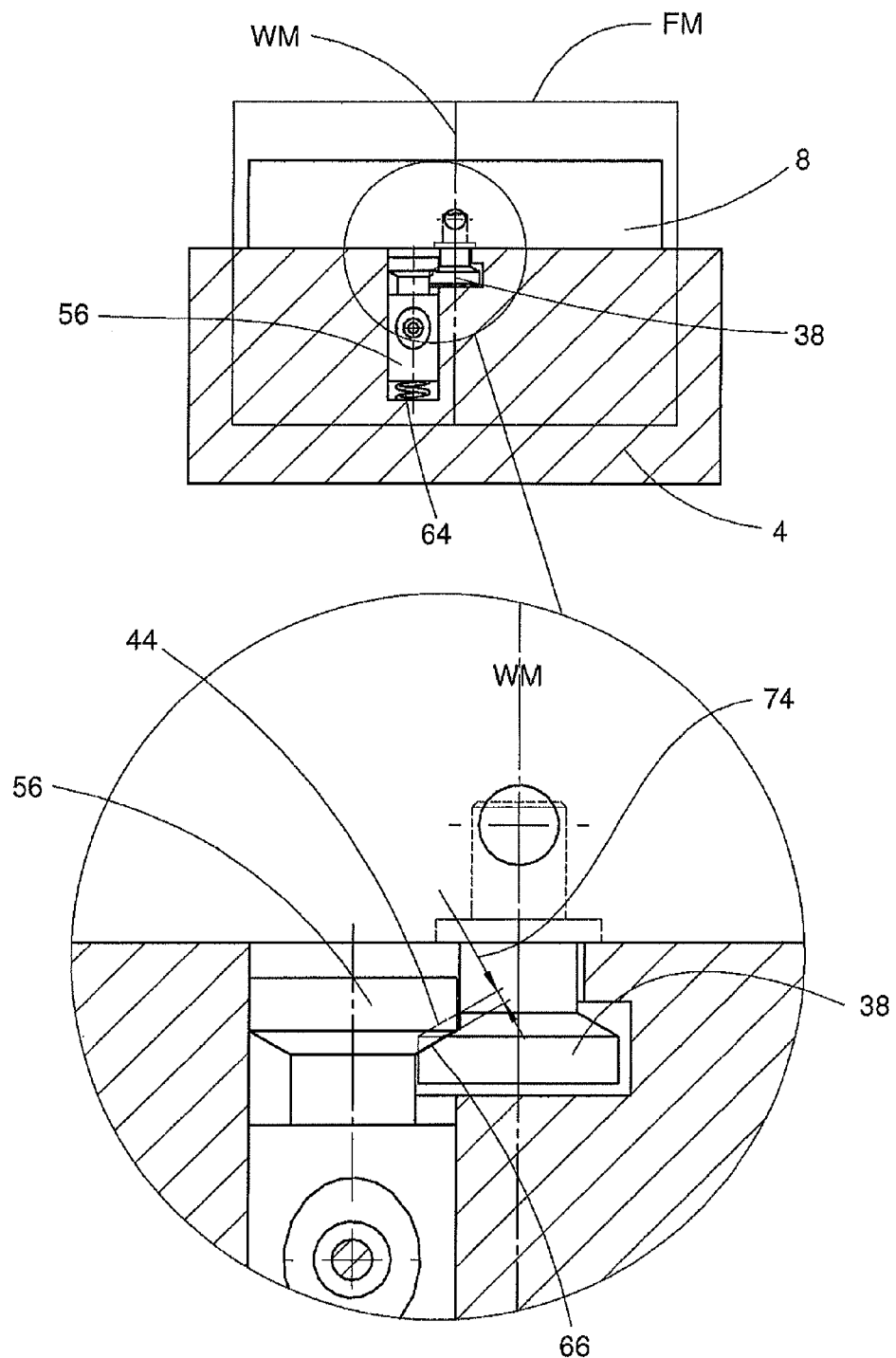
FIG. 9 is a view according to FIG. 8 with the clamping elements of the tool clamping system in the tightened-down position.
Figure 10:
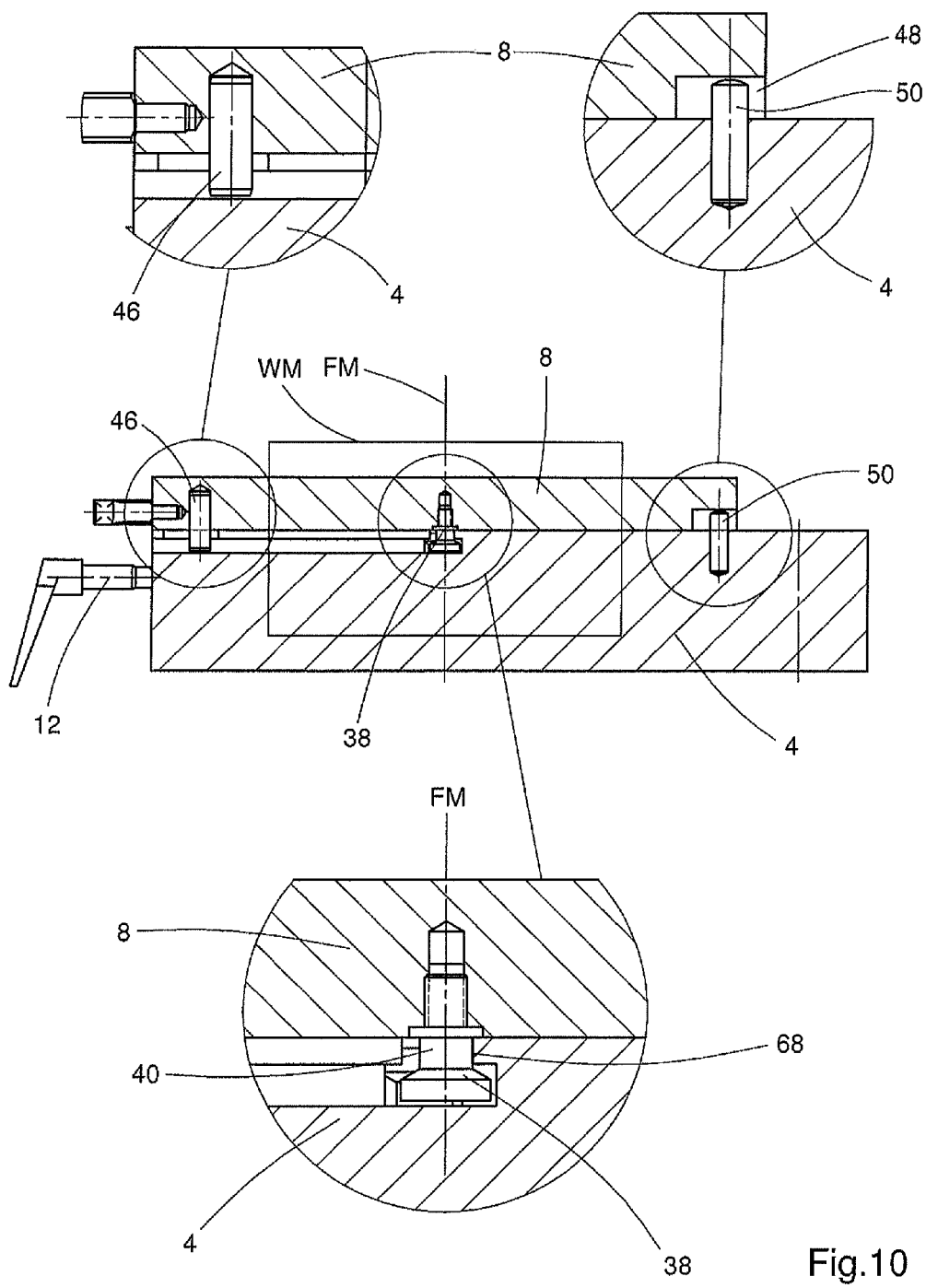
FIG. 10 is a schematic, longitudinal cross section through a tool holder with a tool attached thereto.

More concretely, the draw bolt (see FIG. 5) is offset by the angle β and the dimension D from the intersection of the plane FM of the center of the sheet and the plane WM of the center of the tool. Typical values for the angle β are in the range of 10-20°, whereas the dimension D is preferably in the range of 2-8 mm. Thus, as can be seen in FIGS. 8 and 9, the working surface 66 of the draw bolt 56 moves down toward the target surface 44 of the clamping bolt 38 by the dimension 74, and a positive connection between the draw bolt 56 and the clamping bolt 38 will also be produced in the direction perpendicular to the plane of the drawing. In addition, the radius of the lower part 40 of the clamping bolt 38 of the tool 6, 8 is preferably somewhat smaller than the radius of the depth stop 68 of the tool holder 2, 4, and upon actuation of the draw bolt 56, the clamping bolt 38 will then be pushed precisely into the intersection of the two planes, i.e., the center-of-the-sheet plane FM and the center-of-the-tool plane WM (see FIG. 5).

The width of the T-slot 52 in its narrow area is equal to or slightly larger than the diameter of the positioning pin 46 in the tool 6, 8. The groove 48 in the tool 6, 8 has a width which is equal to or slightly larger than the diameter of the register pin 50 projecting from the tool holder 2, 4. Details of the geometric dimensions of a preferred embodiment of the tool holders 2, 4, and the tools 6, 8 are listed further below with reference to FIGS. 11-14.

In the following, the clamping operation carried out with the clamping mechanism according to the invention will be explained. When the tool 6, 8 is being inserted, the clamping bolt 38, after a certain point, takes over the function of guiding the tool 6, 8 in the T-slot 52 of the tool holder 2, 4. Just before reaching a depth stop 68 (see FIGS. 2 and 5), the small groove 48 in the tool 6, 8 then cooperates with the register pin 50 on the tool holder 2, 4 to correct the alignment of the tool 6, 8 in the tool holder 2, 4 by aligning the center WM of the tool precisely with the center of the tool holder.

Jointly with the cylindrical depth stop 68 on the tool holder 2, 4, the cylindrical lower part 40 of the clamping bolt 38 on the tool 6, 8 now defines the maximum insertion position present at the end of the insertion distance.

During the last phase of the insertion process, the positioning pin 46 cooperates with the narrow area of the T-slot 52 to center the area near the short front side 32 of the tool 6, 8 in the tool holder 2, 4.

By turning the spindle pin 12 in the direction of the arrows shown in FIG. 3, the spindle pin 12 advances along the thread 15 into the tool holder 2, 4. The conical tip 54 of the spindle pin 12 is pressed by the screwing action into the opening 60 in the draw bolt 56 and thus against the guide surface 62. Then, as the clamping process proceeds, the draw bolt 56 presses against the head part 42 of the clamping bolt 38 and thus pushes the clamping bolt 38 deeper into the tool holder 2, 4. The working surface 66 on the draw bolt 56 and the target surface 44 on the clamping bolt 38 are thus pressed against each other, preferably along a contact line 70, as can be seen in FIG. 5. The contact line 70 occurs when both the working surface 66 and the target surface 44 have the same angle of inclination to the horizontal and are designed in the form of parts of the lateral surface of a cone. The slightly offset arrangement of the clamping bolt 38 and the draw bolt 56 and the orientation of the working surface 66 and the target surface 44 to each other bring about a resulting force on the contact line 70, which holds the tool 6, 8 reliably in position.

The resulting force can be divided into the three force components A, B, and C as shown in FIGS. 6 and 7. Force component A draws the tool 6, 8 toward the tool holder 2, 4. Force component B presses the tool 6, 8 sideways against the tool holder 2, 4 via the register pin 50 and the positioning pin 46. Force component C, finally, presses the tool 6, 8 against the depth stop 68 and generates the contact surface 72 (FIG. 5).

To loosen the tool 6, 8, the spindle pin 12 is turned in the opposite direction. The spring element 64 then pushes the draw bolt 56 back, and the tool 6, 8 can be pulled back out again (FIGS. 2 and 3).

Typical dimensions of the base body of the tools 6, 8 shown in FIGS. 13 and 14 are 150-300 mm for the long side 26, 100-270 mm for the short sides 22, 24, and 15-80 mm for the height. The base bodies of the tool holders 2, 4 shown in FIGS. 11 and 12 have somewhat larger dimensions.

The positioning pin 46 on the tool 6, 8 has a diameter of, for example, 12 mm, whereas the lower part 40 of the clamping bolt 38 has a diameter of, for example, 10 mm. The diameter of the register pin 50 on the tool holder 2, 4 is variable and can also be about 10 mm.

While reference numerals were added to the claims in parentheses to assist examination, they are not intended to limit the scope of the appended claims in any way.

The invention claimed is:

1. A tool holder (2, 4) for clamping a tool (6, 8), the tool holder (2, 4) comprising:
    a base body, which comprises a top (18), a bottom (20), a short front side (22), a short rear side (24), and two long sides (26),
    a register pin (50) projecting from the top (18) or bottom (20) of the base body, the register pin (50) being arranged centrally between the long sides (26) and closer to the short rear side (24) than to the short front side (22);
    a straight T-slot (52) in the base body, the T-slot (52) arranged centrally between the long sides (26) and extending from the short front side (22) along the top (18) or bottom (20) of the base body to a terminal area of the T-slot (52) arranged in an area of the base body between the short front side (22) and the short rear side (24);
    a spindle pin (12) with a conical tip (54), the spindle pin (12) arranged adjacent and parallel to the T-slot (52) and movable within the base body;
    a draw bolt (56) arranged in a recess (58) in the base body near the terminal area of the T-slot (52), wherein the draw bolt (56) is slightly offset from the terminal area of the T-slot (52) in a direction toward one of the two long sides (26) of the base body and in a direction toward the short front side (22) of the base body;
    wherein the draw bolt (56) comprises an opening (60) with a slanted guide surface (62) for cooperation with the conical tip (54) of the spindle pin (12), the opening (60) being arranged in such a way that the draw bolt (56) is pulled into the tool holder (2, 4) when the conical tip (54) of the spindle pin (12) moves into the opening (60) toward a clamping position; and
    wherein the draw bolt (56) further comprises a slanted working surface (66), which serves to engage with a corresponding slanted target surface (44) on a clamping bolt (38) on the tool (6, 8).

2. The tool holder (2, 4) of claim 1 wherein the slanted working surface (66) of the draw bolt (56) has a form of a lateral cone surface portion.

3. The tool holder (2, 4) of claim 1 wherein the slanted working surface (66) of the draw bolt (56) is at an angle (α') of 10-45° to the horizontal.

4. The tool holder (2, 4) of claim 1 wherein the opening (60) in the draw bolt (56) is conical and, at an end of the opening (60) facing the short front side (22), has a diameter larger than a widest diameter of the conical tip (54).

5. The tool holder (2, 4) of claim 1 wherein a spring element (64) spring-loads the draw bolt (56) toward an open end of the recess (58), so that, when the conical tip (54) of the spindle pin (12) moves along the guide surface (62) toward the clamping position, the conical tip (54) draws the draw bolt (56) into the tool holder (2, 4) against a force of the spring element (64).

6. The tool holder (2, 4) of claim 1 wherein the register pin (50) is a cylindrical pin.

7. A tool (6, 8) to be clamped in a tool holder (2, 4), the tool (2, 4) comprising:
- a base body, which comprises a top (28), a bottom (30), a short front side (32), a short rear side (34), and two long sides (36),
- a clamping bolt (38) projecting from the top (28) or bottom (30) of the base body in a projecting direction, the clamping bolt (38) being arranged substantially centrally between the long sides (36) and substantially centrally between the short front and rear sides (32, 34), wherein the clamping bolt (38) has a shape of a mushroom with a cylindrical lower part (40) and a head part (42), which comprises a slanted target surface (44), which serves to be acted upon by a slanted working surface (66) of a draw bolt (56) in the tool holder (2, 4), wherein the slanted target surface (44) on the clamping bolt (38) has a form of a lateral cone surface portion which tapers in a direction opposite the projection direction, and wherein the slanted target surface (44) is provided on a side of the head part (42) facing the base body;
- a cylindrical positioning pin (46), which projects from the tool (6, 8) in the projecting direction, wherein the positioning pin (46) is arranged centrally between the long sides (36) and closer to the short front side (32) than to the short rear side (34), wherein the positioning pin (46) has a diameter at least as large as a diameter of the lower part (40) of the clamping bolt (38); and
- a groove (48) arranged centrally between the long sides (36) and extending from the short rear side (34) into the base body.

8. The tool (6, 8) of claim 7 wherein the diameter of the positioning pin (46) is larger than the diameter of the lower part (40) of the clamping bolt (38).

9. The tool (6, 8) of claim 7 wherein the slanted target surface (44) on the clamping bolt (38) is at an angle ($\alpha$) of 10-45° to the horizontal.

10. A work station having a tool holder (2, 4) and a tool (6, 8) attached to the tool holder (2, 4),
a) wherein the tool holder (2, 4) comprises:
- a base body, which comprises a top (18), a bottom (20), a short front side (22), a short rear side (24), and two long sides (26),
- a register pin (50) projecting from the top (18) or bottom (20) of the base body of the tool holder (2, 4), the register pin (50) being arranged centrally between the long sides (26) and closer to the short rear side (24) than to the short front side (22) of the base body of the tool holder (2, 4);
- a straight T-slot (52) in the base body of the tool holder (2, 4), the T-slot (52) arranged centrally between the long sides (26) and extending from the short front side (22) along the top (18) or bottom (20) of the base body of the tool holder (2, 4) to a terminal area of the T-slot (52) arranged in an area of the base body of the tool holder (2, 4) between the short front side (22) and the short rear side (24);
- a spindle pin (12) with a conical tip (54), the spindle pin (12) arranged adjacent and parallel to the T-slot (52) and movable within the base body of the tool holder (2, 4);
- a draw bolt (56) arranged in a recess (58) in the base body of the tool holder (2, 4) near the terminal area of the T-slot (52), wherein the draw bolt (56) is slightly offset from the terminal area of the T-slot (52) in a direction toward one of the two long sides (26) of the base body of the tool holder (2, 4) and in a direction toward the short front side (22) of the base body of the tool holder (2, 4);
- wherein the draw bolt (56) comprises an opening (60) with a slanted guide surface (62) for cooperation with the conical tip (54) of the spindle pin (12), the opening (60) being arranged in such a way that the draw bolt (56) is pulled into the tool holder (2, 4) when the conical tip (54) of the spindle pin (12) moves into the opening (60) toward a clamping position; and
- wherein the draw bolt (56) further comprises a slanted working surface (66); and b) wherein the tool (6, 8) comprises:
- a base body, which comprises a top (28), a bottom (30), a short front side (32), a short rear side (34), and two long sides (36),
- a clamping bolt (38) projecting from the top (28) or bottom (30) of the base body of the tool (6, 8) in a projecting direction, the clamping bolt (38) being arranged substantially centrally between the long sides (36) and substantially centrally between the short front and rear sides (32, 34) of the base body of the tool (6, 8), wherein the clamping bolt (38) has a shape of a mushroom with a cylindrical lower part (40) and a head part (42), which comprises a slanted target surface (44);
- a cylindrical positioning pin (46), which projects from the tool (6, 8) in the projecting direction, wherein the positioning pin (46) is arranged centrally between the long sides (36) and closer to the short front side (32) than to the short rear side (34) of the tool (6, 8), wherein the positioning pin (46) has a diameter at least as large as a diameter of the lower part (40) of the clamping bolt (38); and
- a groove (48) arranged centrally between the long sides (36) and extending from the short rear side (34) into the base body of the tool (6, 8);

c) wherein the slanted working surface (66) of the draw bolt (56) in the tool holder (2, 4) engages with the slanted target surface (44) on the clamping bolt (38) of the tool (6, 8).

11. The work station of claim 10 wherein the draw bolt (56) of the tool holder (2, 4) is offset in such a way from the terminal area of the T-slot (52) toward one of the two long sides (26) of the base body of the tool holder (2, 4) and toward the short front side (22) of the base body of the tool holder (2, 4), and wherein the clamping bolt (38) of the tool (6, 8) and the draw bolt (56) of the tool holder (2, 4) are designed in such a way that the force exerted by the draw bolt (56) on the clamping bolt (38) has a first force component (A) acting toward the top (18) or bottom (20) of the tool holder (2, 4), a second force component (B) acting toward one of the two long sides (26) of the tool holder (2, 4), and a third force component (C) acting toward the short rear side (24) of the tool holder (2, 4).

12. The work station of claim 10 wherein the T-slot (52) has a narrow width area, wherein the narrow width area is substantially equal to the diameter of the positioning pin (46) on the tool (6, 8).

13. The work station of claim 10 wherein a width of the groove (48) in the tool (6, 8) is equal to or slightly larger than a diameter of the register pin (50) projecting from the tool holder (2, 4).

* * * * *